United States Patent
Graffe et al.

[19]

[11] Patent Number: 6,044,366
[45] Date of Patent: Mar. 28, 2000

[54] USE OF THE UNPIVOT RELATIONAL OPERATOR IN THE EFFICIENT GATHERING OF SUFFICIENT STATISTICS FOR DATA MINING

[75] Inventors: Goetz Graffe, Bellevue; Usama Fayyad, Merce Island; Surajit Chaudhuri, Redmond, all of Wash.

[73] Assignee: Microsoft Corporation, Redmond, Wash.

[21] Appl. No.: 09/029,953

[22] Filed: Mar. 16, 1998

[51] Int. Cl.[7] .................................................... G06F 17/30
[52] U.S. Cl. .......................... 707/2; 707/3; 707/4; 707/6; 707/102
[58] Field of Search .................. 707/2, 3, 5, 6, 707/4, 102

[56] References Cited

U.S. PATENT DOCUMENTS

| | | | |
|---|---|---|---|
| 5,201,047 | 4/1993 | Maki et al. | 707/4 |
| 5,511,190 | 4/1996 | Sharma et al. | 707/1 |
| 5,710,915 | 1/1998 | McElhiney | 707/3 |
| 5,713,020 | 1/1998 | Reiter et al. | 707/102 |
| 5,748,905 | 5/1998 | Hauser et al. | 709/249 |
| 5,819,282 | 10/1998 | Hooper et al. | 707/103 |
| 5,878,426 | 3/1999 | Plasek et al. | 707/102 |
| 5,966,139 | 10/1999 | Anupam et al. | 345/440 |

OTHER PUBLICATIONS

Automating the Analysis and Cataloging of Sky Surveys, *Advances in Knowledge discovery and Data Mining*, Chapter 19, pp. 471–493, Fayyad, Usama M., Djorgovski, S. George and Weir, Nicholas, AAAI Press/The MIT Press, Menlo Park California; Cambridge, MA; London, England (1996).

SLIQ: *A Fast Scalable Classifier for Data Mining*, EDBT Conference, Mehta, Manish, Agrawal, Rakesh and Rissanen, Jorma (1996).

*From Digitized Images to Online Catalogs. AI Magazine*, pp. 51–66, Fayyad, Usama M., Djorgovski, S.G. and Weir, Nicholas, (Summer 1996).

*Data Mining and Knowledge Discovery: Making Sense Out of Data*, Fayyad, Usama M. Submitted to IEEE Expert, for publication in the special issue on Data mining (Aug., 1996).

*Panning for Data Gold, New Scientist.* No. 2031, Weekly E1–80, pp. 31–33 (May 25, 1996).

*Primary Examiner*—Jean R. Homere
*Attorney, Agent, or Firm*—Watts, Hoffmann, Fisher & Heinke, Co.

[57] ABSTRACT

The invention concerns a method and apparatus for generating a tabulation of counts of occurrences of value combinations of a set of attributes over a relation consisting of a set of database records. The gathered counts (also referred to as sufficient statistics) of attribute occurrences or correlation counts is most preferably used in building a classification or density estimation model from the database records that can be used to predict some attribute values based on other attribute values. A new SQL operator designated the 'UNPIVOT' operator operates by scanning the database records and for each record reorganizes that data to form an UNPIVOTED data record that include the combinations of attribute name, attribute value and the values for one or more selected class attributes. The UNPIVOTED table can be used to produce the desired sufficient statistics in one scan of the data using standard database engines. While materialization of UNPIVOTED table would cause a large added scan cost overhead, the UNPIVOT operator allows us to achieve the counts without the added cost by combining the UNPIVOT operator with other SQL 'select' and 'group by' operators the UNPIVOTED table can be counted without the need for materializing it. The result is a guaranteed one pass algorithm that does not incur the added scan cost factor. The savings in scan cost can extend to several orders of magnitude compared to other methodologies for getting the counts supported by current database engines. The sufficient statistics so gathered can be used to drive a variety of data mining algorithms.

21 Claims, 2 Drawing Sheets

USE OF THE UNPIVOT RELATIONAL OPERATOR IN THE EFFICIENT GATHERING OF SUFFICIENT STATISTICS FOR DATA MINING

FIELD OF THE INVENTION

The present invention concerns the efficient gathering of sufficient statistics that are needed to perform data mining and data analysis operations such as building classification models (also called classifiers) from a large database having records stored on a mass storage device (database system).

BACKGROUND ART

With the growth and proliferation of databases (and data warehouses) into almost any type of organization, there is an ever growing need for automated tools to help analyze, visualize, and summarize the contents of large databases.

Decision support queries can be well-specified (e.g. give me a report of sales by store over an exactly specified period of time) and not so well specified (e.g. find me records in the data that are "similar" to records in table A but "dissimilar" from records in table B). For example, in a fraud detection setting, table A can represent transactions known to be associated with fraudulent activity while table B contains transactions known to be legal. Such queries in general require a method for modeling the contents of the data. Methods for constructing models from databases are examples of data mining methods. These methods include a wide class of predictive and descriptive modeling techniques.

Examples of data-driven decision support situations abound. For example, a credit card or telecommunications company that would like to query its database of usage data for records representing fraudulent cases. Another example would be a scientist dealing with a large body of data who would like to request a catalog of events of interest appearing in the data. Such patterns, while recognizable by human analysts on a case by case basis, are typically very difficult to describe in a SQL query or even as a computer program in a stored procedure. Often the domain expert does not even know what variables determine the decision.

An alternative effective means of interacting with the database is to state the query by example. In this case, we assume one of the fields in the database represents values of a target variable (often called a class variable). The values of the class column could have been obtained by asking a domain expert to label cases (a subset of the records called a training set) with appropriate values of the class variable. The data mining system builds a model to automatically label records (i.e. distinguish one class value from another for any given record) based on the training data. The system can then apply the extracted classifier to search the full database for events of interest or to classify future cases as they arrive. This approach is typically easier than detailed modeling of the causal mechanisms underlying the phenomenon of interest because examples are usually readily available, and humans find it natural to interact at the level of labeling cases. Also, it is often only possible to obtain a label (class) for a case in retrospect (e.g. fraud).

The difficulty in building classification models manually derives from the fact that humans find it particularly difficult to visualize and understand a large data set. Data can grow along two dimensions: the number of fields (also called dimensions or attributes) and the number of cases or records. Human analysis and visualization abilities do not scale to high-dimensions and massive volumes of data. A standard approach to dealing with high-dimensional data is to project it down to a very low-dimensional space and attempt to build models in this simplified subspace. As the number of dimensions grows, the number of choice combinations for dimensionality reduction explodes. Furthermore, a projection to lower dimensions could easily transform an otherwise solvable discrimination problem (classification problem) into one that is impossible to solve. If the human analyst is trying to explore models, then it becomes infeasible to go through the various ways of projecting the dimensions or selecting the right subsamples (reduction along columns and rows of the target database). An effective means to visualize data would be to employ data mining methods (e.g. classification) to perform the appropriate reductions. Because data growth rates are higher than humans can keep up with using traditional manual analysis techniques, automated data mining techniques become necessary if the goal is to utilize the data in a timely manner. In any competitive environment where others who do utilize data resources better will gain a distinct advantage, decision support operations are very important.

For the reasons cited above, using standard database query languages (such as SQL) to build classification models can be very slow and ineffective. Queries aimed at projecting data down to lower dimensions often leave the analyst without any clue of where to proceed. Data mining methods can explore such projections automatically and assess which attributes are likely to be important. For a wide class of such mining algorithms (including classification), and important step is deriving counts of correlations of values of attributes. For example, in a classification problem, correlation counts of combinations of values of attributes with values of the class variable are of particular interest.

Table 1 depicted below illustrates the makeup of the data records of a database. Each of the records has a number of attributes or fields, $Attr\_1, Attr\_2 \ldots Attr\_m$ and includes an attribute or field that is labeled 'class'. 'Class' is the target attribute whose value is to be predicted by a classifier based on other attributes.

TABLE 1

| | | Data Table | | | |
|---|---|---|---|---|---|
| CaseID | Attr_1 | Attr_2 | ... | Attr_m | Class |
| ICase 1 | V_1j | V_1k | ... | V_m1 | Ci |
| ICase 2 | V_1i | V_2l | ... | V_mk | Cj |
| ... | ... | ... | ... | ... | ... |
| ICase N | V_1q | V_2r | ... | V_ms | Ck |

The first attribute in the table under the heading 'CaseID' is a key indexed field for the records in the table.

A Counts Table that is based on the Table 1 data has the following form:

TABLE 2

| | Counts Table | | |
|---|---|---|---|
| Attr_ID | Attr_val | ClassVAl | Count |
| Attr_1 | v_11 | C1 | # |
| Attr_1 | v_11 | C2 | # |
| ... | ... | ... | ... |
| Attr_1 | v_11 | Ck | # |
| Attr_1 | v_12 | C1 | # |

TABLE 2-continued

Counts Table

| Attr_ID | Attr_val | ClassVAl | Count |
|---|---|---|---|
| ... | ... | ... | ... |
| Attr_1 | v_1r₁ | Ck | ... |
| ... | ... | ... | ... |
| Attr_m | v_m1 | C1 | # |
| Attr_m | v_m1 | C2 | # |
| ... | ... | ... | ... |
| Attr_m | v_mr_m | Ck | # |

This table gives a count of the number of occurrences of every attribute-value and class-value combination in the database. Note that this table is much smaller than the data table. It has #class-values×#attributes×#vals/attribute count cells. In most applications this is much smaller than N. the number of records in the database, typically by several order magnitudes. Table 2 tabulates counts for only one class variable with values C1 . . . Ck. In principle, the table can accommodate as many class variables as desired. This is done by adding a ClassID column to table 2. Stated another way, each class variable gets a column in the correlation counts table.

An illustrative example of a database for building a classifier contains data records describing operations of a large number of retail stores that are located throughout the country. Representative sample data records for such a database are listed below in Table 3.

TABLE 3

| CaseID | StoreType | Region | ... | Locationtype | Season | (Class) Profitable |
|---|---|---|---|---|---|---|
| record1 | Shoes | Midwest | ... | Urban | Summer | Average |
| record2 | Elecs | West | ... | Mall | Christmas | VeryProf |
| record3 | Misc | Nwest | ... | Mall | Fall/School | BreakEven |
| ... | ... | ... | ... ... | ... | ... |
| recordN | Shoes | Midwest | ... | StripMall | Summer | Losing |

The goal of the data mining is to derive a model (classifier) to predict class values based on the other attributes of table 3. Such a classifier may be used to identify a set of factors that can be used in locating a store of a particular type that will produce high profits without necessarily actually set up a store to gain operating data.

An example counts table associated with the data shown in Table 3 is given in Table 4:

TABLE 4

| Attribute | Value | Profitability | count |
|---|---|---|---|
| Attribute1 | v11 | Ave | C₁₁ₐ |
| Attribute1 | v11 | Vprof | C₁₁ᵥ |
| Attribute1 | v11 | Losing | C₁₁ₗ |
| Attribute1 | v11 | BEven | C₁₁ᵦ |
| Attribute1 | v12 | | ... |
| | v13 | | ... |
| | ... | | ... |
| Attribute2 | v21 | | ... |
| | v22 | | ... |
| | v23 | | ... |
| LocationType | StripMall | Ave | C_SMA |
| | | Vprof | C_SMV |
| | | Losing | C_SML |
| | | Beven | C_SMB |
| | Rural | Ave | C_RA |
| | | Vprof | C_RV |
| | | Losing | C_RL |
| | | Beven | C_RB |
| | Urban | Ave | C_UA |
| | | Vprof | C_UV |
| | | Losing | C_UL |
| | | BEven | C_UB |
| | Mall | Ave | C_MA |
| | | Vprof | C_MV |
| | | Losing | C_ML |
| | | Beven | C_MB |
| StoreType | Shoes | Ave | 25,000 |
| | | Vprof | 15,000 |
| | | Losing | 25,000 |
| | | Beven | 30,000 |
| | Electr | Ave | 25,000 |
| | | Vprofit | 20,000 |
| | | Losing | 30,000 |
| | | Beven | 40,000 |
| | Misc | Ave | 250 |
| | | Vprofit | 250 |
| | | Losing | 0 |
| | | Beven | 30000 |
| AttributeM | vM1 | | ... |
| | vM2 | | ... |

Table 4 is organized with the class variable as a column heading and the attribute values of the various attributes that make up the records of the database as row designators. In the Illustrated counts table the 'Location Type' has only four discrete values, i.e. StripMall, Rural, Urban, and Mall. The store location attribute 'StoreType' has the three discrete values, i.e. Electronics (Electr) , Misc, and Shoes.

Each record has one class value and a combination of attribute values and therefore contributes a count to the counts table for each of its M attributes. For each value of the attribute LocationType and for each value of the Class variable (Profitable) a count of the number of cases in the data subset under consideration (node in the tree) is recorded. A case or record contributes to the count of LocationType=Mall and Profitable=VProfitable if it has those two values for the two attributes. The total number of entries in the counts table for a given attribute, LocationType, for example is equal to the total number of entries in the counts table for every other attribute (assuming there are no null entries in the original table.)

A wide class of efficient data mining algorithms for building, classification models from data depend on a core set of sufficient statistics (referred to in the present application as correlation counts) that need to be computed from the database. Examples of the use of the correlation counts in building a classifier are found in Appendix A to the application.

These aggregates (correlation counts) can be obtained by executing a series of Group By queries in ANSI standard SQL. However, the structure of these queries can be exploited so that the set of queries can be executed efficiently in a single scan of the data table. By using a new operator, the present invention enables the collection of such aggregates efficiently and with minimal modification to standard database server software.

SUMMARY OF THE INVENTION

The present invention addresses the problem of gathering, sufficient statistics of the data, represented in the form of a counts table, from a large database having many records. These sufficient statistics represent all the information needed to drive the algorithm for building a classification model. Algorithms that use these sufficient statistics are not the subject of this invention, hence we only focus on the problem of efficiently gathering these statistics. A counts table represents the correlations between the values of a set of attributes to be predicted (called class variables) and a set of variables that are to be used to predict the class variables. In order to build a counts table one must scan the database. Scanning of data is an expensive operation and it is desirable to minimize the number of times the data must be scanned to build a classifier, as well as the cost of each scan.

The invention can be applied in the support of construction of various types of classification models, including decision trees, classification rules, Naïve Bayes Classifier (assumes conditional independence of inputs given class), Bayesian network classifiers, and general classifiers based on density estimates that are represented by correlation counts between input fields and class variables being predicted. Appendix A to this application gives examples of how the counts table can be used to evaluate scoring methods used in model construction.

The invention concerns a new method and apparatus for building the fundamental table of correlation counts (sufficient statistics) for a large data. The data table in (general may be significantly larger than the available main memory on a computer. The invention relies primarily on a new SQL operator (UNPIVOT) to support the efficient implementation of the algorithm over a DBMS. The UNPIVOT operator is described in a related patent application entitled "Electronic Database Operations for Perspective Transformations on Relational Tables", Ser. No. 09/039, 728 to Graefe et al which is filed concurrently herewith and is incorporated herein by reference.

Consider a standard SQL approach to generating the counts table shown in Table 2 from the data table given in Table 1. The following SQL query will yield the desired Table 2 from Table 1. Assume that Table 1 is named Data_Table in the database. Further for generality we allow an arbitrary (but fixed) where clause to appear in the selection. We designate the the condition by the sumbol: "some condition" below.

```
Select Attr_1 class, count(*)
From Data_table
Where some_condition
Group By class, Attr_1
UNION
Select Attr2, class, count(*)
From Data_table
Where some_condition
Group By class, Attr_2
...
UNION
```

```
Select Attr_m, class, count(*)
From Data_table
Where some_condition
Group By class, Attr_m
```

Note that this union of m subqueries is unlikely to be detected by a query optimizer as serviceable in only one sequential scan of the data, especially for large m (e. 50 or 100, . . . ). It is likely that a database engine will take multiple scans of the data. In fact most straightforward implementations of database optimizers will cause m scans of the data to take place.

A simpler alternative, is to store the data in a normalized form. Hence, map the Training Data Table into the following normalized form that we call Unpivoted_Table:

The Unpivoted_Table is a 4 column table shown in Table 5.

TABLE 5

| Unpivoted_Table | | | |
|---|---|---|---|
| CaseID | AttrID | Attr_val | Class |
| ICase1 | Attr_1 | V_11 | C1 |
| ICase1 | Attr_2 | V_21 | C2 |
| ... | ... | ... | ... |
| ICase1 | Attr_m | V_m1 | Cj |
| ... | | | |
| IcaseN | Attr_1 | V_1N | Cj |
| IcaseN | Attr_2 | V_2N | Ck |
| ... | ... | ... | ... |
| p, %'5·i(.p | Attr_m | V_mN | Cl |

To get our goal Counts table (Table 2) from this Unpivoted_table table we simply execute the following query:

```
Select AttrID Attr_val, Class_val, count(*)
From Unpivoted_table
Group by AttrID, Attr_Val, Class
```

While this query will be serviced in a single scan in the data, such a scan will be much more expensive than a single scan of the data shown in Table 1 due to the increased size of the Unpivoted_Table table. Appendix B provides an analysis of why changing the representation of the data on disk to the one shown in Table 5 is a bad idea, even if the training data is sparse (assuming acceptable limits on sparseness, e.g. any attribute has a value defined on 5% of the data only). Clearly if data is at an extreme of sparseness, then the unpivoted representation will be preferred, however, such data will not likely be useful for data mining algorithms that build classification models. Appendix B shows the above unpivoted representation results in significant increase of the scan cost for dense or evenly fairly sparse data sets. This invention describes how we can exploit the best of each representation efficiently and effectively within a standard SQL Database engine.

The present invention concerns a method and apparatus for efficiently generating a tabulation of occurrences of selected (one or more) class attributes and other variables in the database, referred to previously as a Counts Table.

A new SQL operator designated the 'UNPIVOT' operator scans database records and for each record reorganizes that data to form an UNPIVOTED data record that include the combinations of attribute name, attribute value and the values for one or more selected class attributes. The data of Table 1 can be operated upon by using the UNPIVOT operator to produce the unpivoted table shown in Table 5. By combining the UNPIVOT operator with existing SQL 'select' and 'group by' operators the large io UNPIVOTED table (table 5) need not be materialized. Rather, the UNPIVOT operator is applied to reduce the data to unpivoted form during processing only. A Counts Table is provided with only a single scan of the data table and without incurring the extra cost of storing or scanning the unpivoted table data on disk.

One object of the invention is an efficient tool useful on any computer (personal or mainframe) in communication with a large database of records for use by the computer in building a classification model. These and other objects and advantages of the invention will become better understood from the accompanying detailed description of a preferred embodiment of the invention which is described in conjunction with the accompanying drawings.

DETAILED DESCRIPTION OF ILLUSTRATIVE EMBODIMENT

Figure 1:
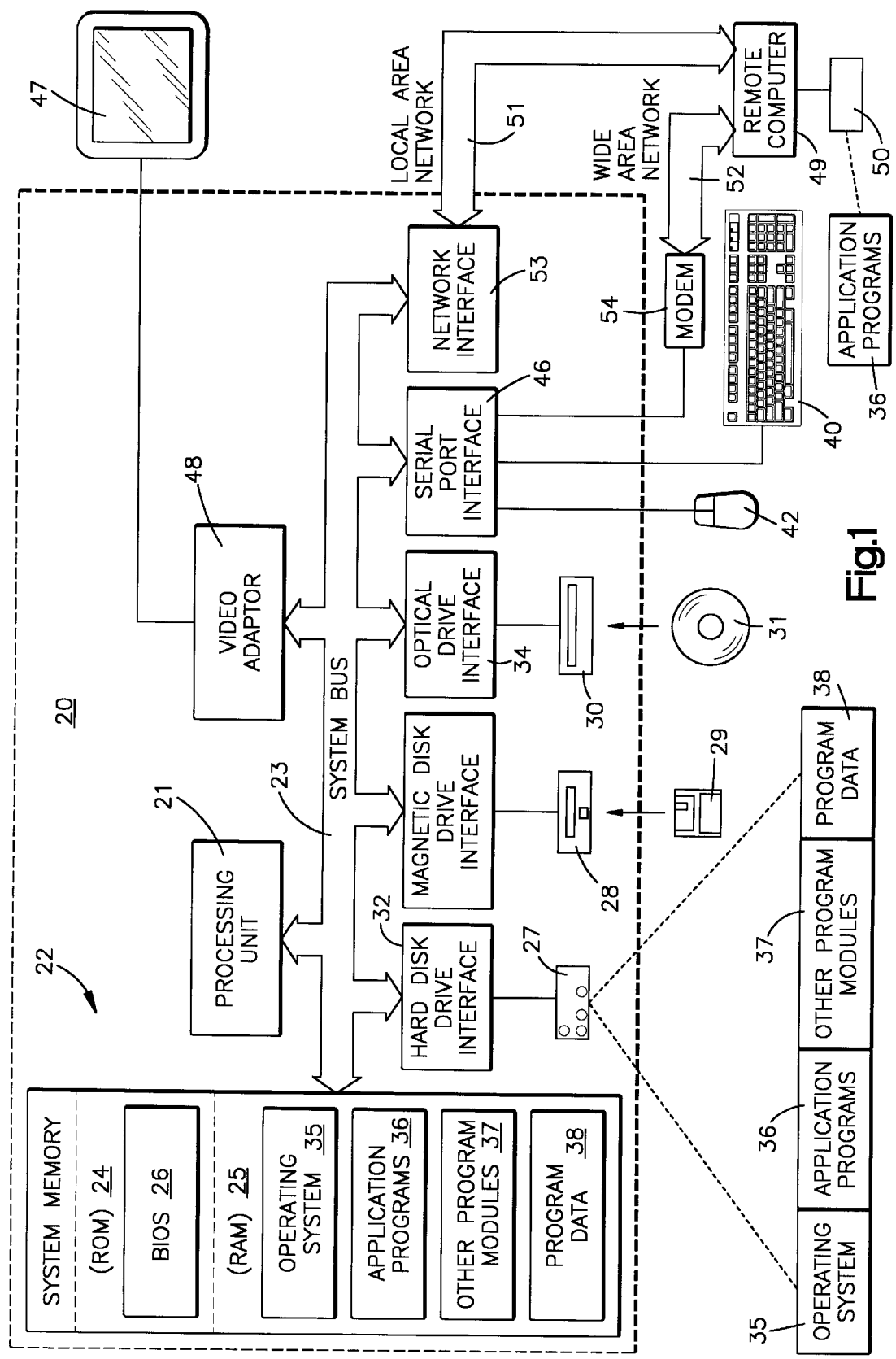
FIG. 1 is a schematic illustration of a computer system for use in practicing the present invention.

The present invention concerns a mechanism for producing a counts table that utilizes a new SQL operator for reorganizing data records in a database. Copending U.S. application Ser. No. " " to Graefe et al that was filed contemporaneously with the present application discloses two new operators 'PIVOT' and 'UNPIVOT' for reorganizing data in a database. Appendix C contains a short discussion of the PIVOT operation which is the inverse of the UNPIVOT operation.

The UNPIVOT operation with a maps a single data record having multiple columns (say more than k columns) into a set of k records: one for each of the k columns be UNPIVOTed. Each of the k new records consists of all the original fields (fields not intended for unpivoting) in the original record plus two additional columns containing an attribute name and an attribute value for one of the k fields to be UNPIVOTed. Consider the following example:

Applying the operator Table 3. UNPIVOT ('Attr_Value' for 'Attr_Name' in (StoreType, Region, LocationType, Season)) to Table 3 one gets the 'UnPivoted table', Table 6 depicted below.

TABLE 6

| CaseID | Attr_Name | Attr_Value | Profitable |
|---|---|---|---|
| 1 | Store_type | Shoes | Ave |
| 1 | Region | Midwest | Ave |
| 1 | Locationtype | Urban | Ave |
| 1 | Season | Summer | Ave |
| 2 | Store_type | Electronics | VeryProf |
| 2 | Region | West | VeryProf |
| 2 | Locationtype | Mall | VeryProf |
| 2 | Season | Winter | VeryProf |
| 3 | Store_type | Misc | BreakEven |

Notice that for each of the records in Table 3 the table 6 output includes tie attribute name and the associated attribute value. The grouping class variable 'profitable' and the CaseID associated with the attribute name/attribute value pair are also found in each of the resulting records since they were not mentioned in UNPIVOT.

The following summarizes the UNPIVOT operation:

Given an input table T with columns or attributes (X, Y1, Y2, ..., Yk, Z) the operation T.UNPIVOT('Attr_Value' for 'Attr_Name' in (Y1, Y2, Y3 ... Yk) is performed by the steps of listing one:

| Listing One |
|---|
| while rows in table T left to be scanned{<br>    for each input row (X, Y1, Y2, ..., Yk, Z){<br>        for k in 1, 2, ..., k{<br>        Create an output row of the form:<br>        (X, Y:=the string 'yk', Y:=the string representation of the<br>            value yk in the input row, Z)<br>        }<br>    }<br>} |

Counting instances for each combination of attribute name, attribute value and the class variable 'profitable' gives the information contained in the counts table of Table 4. The 'Unpivoted Table' has a larger number of rows than the original unpivoted table since it has multiple records for each record of the original table.

The SQL operators of 'Select' and 'Group by' can be used with the UNPIVOT operator to avoid materializing the unpivoted table on disk by grouping the unpivoted rows as they are produced. The form of the SQL query is:

TABLE 3

| CaseID | StoreType | Region | ... | Locationtype | Season | (Class) Profitable |
|---|---|---|---|---|---|---|
| record1 | Shoes | Midwest | ... | Urban | Summer | Average |
| record2 | Elecs | West | ... | Mall | Christmas | VeryProf |
| record3 | Misc | Nwest | ... | Mall | Fall/School | BreakEven |
| ... | ... | ... | ... ... | ... | ... |
| recordN | Shoes | Midwest | ... | StripMall | Summer | Losing |

```
Select AttrName AttrVal, Class, Count(*)
   From Table1.UNPIVOT(AttrVal for AttrName in Attr_1, . . . Attr_m)
Group by AttrName, AttrVal, Class
```

This statement produces Table 7 which is listed below and is seen to be similar to the counts table of Table 4. It contains the count for all possible combinations of Attribute Name, Attribute Value, and Class.

TABLE 7

| AttrName | AttrVal | Class | Count |
|---|---|---|---|
| Attr_1 | v_11 | C1 | # |
| Attr_1 | v_11 | C2 | # |
| ... | ... | ... | ... |
| Attr_1 | v_11 | Ck | # |
| Attr_1 | v_12 | C1 | # |
| Attr_1 | v_12 | C2 | # |
| ... | ... | ... | ... |
| Attr_1 | $v\_1r_1$ | Ck | # |
| ... | ... | ... | ... |
| Attr_m | v_m1 | C1 | # |
| Attr_m | v_m1 | C2 | # |
| ... | ... | ... | ... |
| Attr_m | $v\_mr_m$ | Ck | # |

Returning to the retail store example consider the query:

```
Select AttrName AttrVal, Class, Count(*)
   From Table3.UNPIVOT('AttrVal' for 'AttrName' in Attr_1, . . .
   StoreType, LocationType, . . . Attr_m)
Group by AttrName, AttrVal, Class
```

The results of this query are listed in Table 8.

TABLE 8

| AttrName | AttrVal | Class | Count |
|---|---|---|---|
| Attr_1 | v_11 | Average | # |
| Attr_1 | v_11 | VeryProf | # |
| Attr_1 | v_11 | BreakEven | # |
| Attr_1 | v_11 | Losing | # |
| ... | | | |
| StoreType | Shoes | Average | 25,000 |
| StoreType | Shoes | VeryProf | 15,000 |
| StoreType | Shoes | BreakEven | 30,000 |
| StoreType | Shoes | Losing | 25,000 |
| StoreType | Electr | Average | 25,000 |
| StoreType | Electr | VeryProf | 20,000 |
| StoreType | Electr | BreakEven | 40,000 |
| StoreType | Electr | Losing | 30,000 |
| ... | ... | ... | ... |
| Attr_m | v_m1 | C1 | # |
| Attr_m | v_m1 | C2 | # |
| ... | ... | ... | ... |
| Attr_m | $v\_mr_m$ | Ck | # |

The view of data that is created by this query is equivalent to the counts table of Table 4. This data is sufficient for a model constructor 60 (FIG. 2) to use in building a model (e.g. a decision tree split, a naïve Bayes classifier, or a component in a general density estimation scheme, see Appendix A). The process of building table 8 is performed in a pipeline operation and will not be materialized in the form of a table such as table 6. Each row that is produced during the UNPIVOT operation of listing one is grouped according to the headings of the select part of the instruction and then discarded. The use of the UNPIVOT operation is a guarantee of a single scan execution and utilization of a standard database interface 80 to derive the desired counts table.

The analysis of Appendix B shows that scanning, the original (pivoted) table is much more efficient than scanning the normalized (UNPIVOTED) table. Since the data in the database will be scanned multiple times in the process of generating a classification model (e.g. during the construction of a decision tree), it would be advantageous to make sure that the data that is scanned on disk in the PIVOTED (original) format (dense, pivoted as shown in Table 1), even if the data are fairly sparse (quantification of degree of sparsity/density is given in Appendix B). This suggests that if the original data were provided in the format of a normalized table (e.g. the table of Table 5 or Table 6), then it Would be advantageous first represent it as a Pivoted form (table 1) as a preprocessing step to data mining for classification models. This can be achieved with a simple application of the PIVOT operator as follows:

(Select *
From Normalized_table.PIVOT (attr_val for attrID in (Select distinct
AttrID from Normalized_table) INTO Data_Table)

Of course this preprocessing is only beneficial if it is anticipated that the table will be scanned multiple times (e.g. in decision tree generation).

First Alternate Embodiment of the Invention

The above discussion illustrates one use of the invention where there is a single class column in the training table of data. In principle there could be multiple columns Class1, Class2 etc that are to be treated as separate class column for the purposes of building a counts table. This variation adds more columns to Table 7 so that the column headings of Table 1 become:

(CaseID, Attr_1, Attr_2, . . . , Attr_m, Class1, Class2, . . . , ClassM)

In the output of Table1.UNPIVOT('Attr_val' for 'Attr-Name' in (Attr_1, . . . , Attr_m), the Class1, Class2, etc attributes are grouping columns and the result of such an UNPIVOT operation will be a table with 3+M columns compared to the 3+1 columns when there is only one class attribute.

To obtain the counts table one would execute a union of M group by subqueries on the resulting UNPIVOT table to obtain a desired count against each of the class1, . . . , classM columns. However, a second application of UNPIVOT will remove the need for the multiple 'group by' commands. The idea is to apply a second UNPIVOT to the output of the first UNPIVOT to reduce it down to a table of 5 columns and then apply a single 'group by' statement to achieve the desired counts table.

The following is an example of the new SQL query for this example.

```
Select AttrName, AttrVal, ClassId, ClassVal, count(*)
 From (
 select * from
 Data_table.UNPIVOT(AttrVal for AttrName in (Attr_1, . . . , Attr_m)).
 UNPIVOT (ClassVal for ClassId in (Class1, . . . , ClassM))
 Group by AttrName, AttrVal, ClassID, ClassVal
```

The above shows how to achieve the desired counts using UNPIVOT twice. However, the copending application to Graefe et al discloses an extension of the UNPIVOT command allows the following syntax:

```
Select AttrName, AttrVal, ClassId, ClassVal, count(*)
  From (
  select * from
    Data_table.UNPIVOT(AttrVal for AttrName in (Attr_1, . . . , Attr_m)
    AND ClassVal for ClassId in (Class1, . . . , ClassM))
  Group by AttrName, AttrVal, ClassID, ClassVal
```

This second command syntax is simipler and provides the same output counts table as a result.

Second alternate embodiment of the invention

In principle, the 'class' columns and the 'attribute' columns in the table need not be mutually exclusive. The general case is where one has M columns, and would like to treat one of the M columns as the 'class' column. However, for any particular set of correlation counts with respect to any fixed class column, say column j, we would like to treat all other M−1 columns as attributes.

For example, assume a data table T consists of the following M columns: (Attr_1, Attr_2, . . . , Attr_M). Assume that one would like to treat Attr_1 and Attr_2 as "class" variables, that is, one wants to see the number of times the value of attribute Attr_1 co-occcured with the values of every attribute in Attr_2, . . . , Attr_M. However, since Attr_2 is also to be treated as a class variable, one would like to know how many times Attr_2 values co_occured with values of all other attributes Attr_1, Attr_3, . . . , Attr_M.

One solution is to preprocess the table T and replicate the class columns as additional columns on a new table T2 which will now have M+2 columns, then carry out the above operation of the first alternate embodiment of the invention. If we are to use the standard (unextended) UNPIVOT operator this can be done as follows: Let Dtable be a table with M columns (Attr_1, . . . , Attr_M). Assume Attr_1 and Attr_2 are to be treated as "class" columns as well as inputs:

```
Select AttrID, Attr_val, ClassID, ClassVal, count(*)
  From (
  select * from
    (Select Attr_1, . . . , Attr_M attr_1 AS Class1, Attr_2 AS Class2 from
    Dtable).UNPIVOT(Attr_val for AttrID in (Attr_1, . . . , Attr_m)
    ).UNPIVOT(ClassVal for ClassID in (Class1, Class2))
  Group by AttrID, Attr_Val, ClassID, ClassVal
```

This produces the output table of the first alternative embodiment. Note that column replication of Attr_1 and Attr_2 was achieved by the (Select Attr_1, . . . , Attr_M, Attr_1 AS Class1, Attr_2 AS Class2 from Data_table) statement embedded in the query. Note that there is a potential added scan cost due to column replication, but since the replication is embedded in a pipeline, it is assumed that the table with replicated columns will not be materialized. If replication can be done in the pipeline as an intermediate step, then the first alternate embodiment can be employed to achieve the desired effect efficiently.

Note that classes and attributes are now no longer mutually exclusive. In fact, one can achieve this result with an extended UNPIVOT version that utilizes an OVER clause in combination with the IN clause:

Data_table.UNPIVOT(Attr_val for AttrID in (Attr_1, . . . , Attr_M)
OVER Attr_1, Attr_2)

With reference to FIG. 1 an exemplary data processing system for practicing the disclosed data mining engine invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
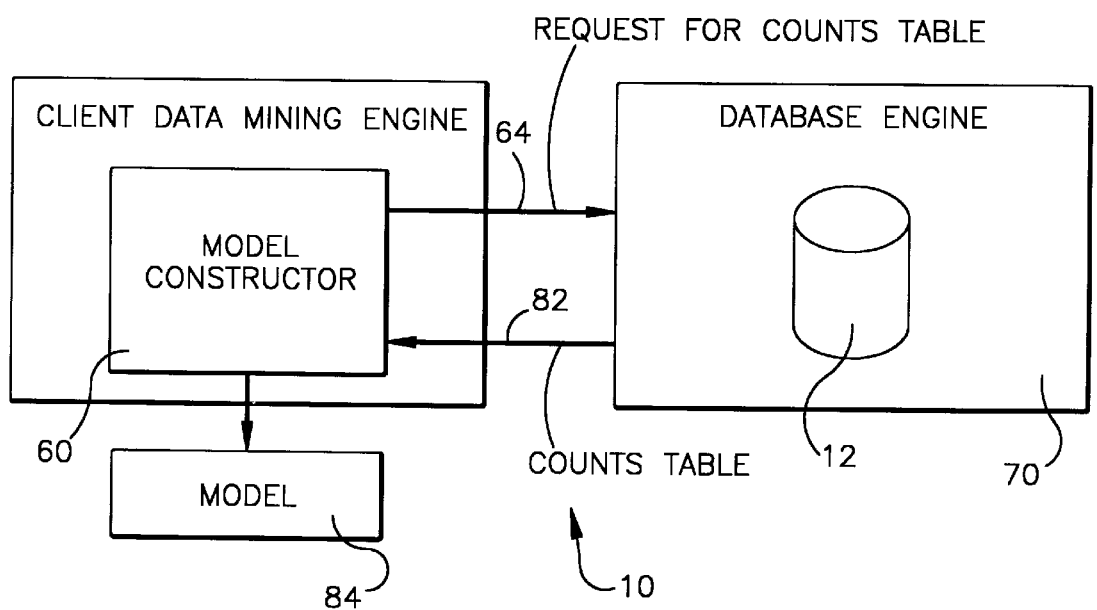
FIG. 2 is a schematic depictions of software components that make up an illustrative data mining engine.

The present invention has particular application for use with databases made up of large sets of data. A data mining engine 10 (FIG. 2) accesses records of data that together form a database 12 and builds a classification model or classifier. FIG. 2 is a schematic of the software components that make up the data mining engine 10. A model constructor 60 requires as an input the record format of data records of the database. This includes a definition of the data attributes and the types of data for each attribute. The model constructor sends out requests 64 for counts data and these requests are maintained in a request list 66 and processed in turn by a counts server 70. The counts server 70 makes specific requests in the form of data access request through a database interface 80 which gathers data from the database 12 and receives data records from the database 12. The counts server 70 processes the records returned by the database and produces a counts table 82. The model constructor uses the counts tables provided by the counts server to evaluate the data and make additional requests 64 from the counts server 70 until a classifier model 84 is produced as an output from the data mining engine 10. The presently preferred model constructor 60 builds a decision tree using the classification criteria described in Appendix A to split data within the database 12 into nodes.

While alternate embodiments of the present invention have been described with a degree of particularity, it is the intent that the invention include all modifications and alternations from the disclosed design falling within the spirit or scope of the appended claims.

APPENDIX A

Illustrative Example of Use of Correlation Counts Table Once Obtained

As an example, we show how above table could be used in the attribute selection stage of the construction of a decision tree classification model. Decision trees can use many measures for selection, we'll use information entropy as a representative measure for purposes of illustration. To evaluate the information entropy of Class against Attr_1 as a splitting attribute, where one is to branch on all values of Attr_1: Let $CV(1j,i)$ be the entry in cell in row Attr_1 V_1j and class value Ci $$\text{Let } Sum(1, j) = \sum_{i=1}^{k} CV(1, j, i)$$

$$\text{Let } N = \sum_{j=1}^{r_1} Sum(1, j)$$

$$\text{Entropy} = -\sum_{j=1}^{r_1} \frac{Sum(1, j)}{N} \left( \sum_{i=1}^{k} \frac{CV(1, j, i)}{Sum(1, j)} \log\left(\frac{CV(1, j, i)}{Sum(1, j)}\right) \right)$$

Similarly, many other impurity and statistical measures can be computed strictly from the values in the correlation counts table. For example, the conditional probability, of an attribute value given the class is:

$$Prob(Attr\_1 = V\_1j \mid Class = Ci) = \frac{CV(1, j, i)}{Sum(1, j)}$$

This call then be used by Bayes Rule and the conditional independence assumption to predict the probability of the class value given all the observed input values, and hence classification is obtained $$Prob(Class = Ci \mid Attr\_1 = a1j, Attr\_2 = a2j, \ldots, Attr\_m = amj) =$$

$$\frac{Prob(Class = Ci)}{Prob(Attr\_1 = a1j, Attr\_2 = a2j, \ldots, Attr\_m = amj)}$$

$$\prod_{t=1}^{m} Prob(Attr\_t = atj \mid Class = Ci)$$

The denominator term is never computed explicitly, but is obtained by taking the sum of the terms:

$$\sum_{i=1}^{k} Prob(Class = Ci) \prod_{k=1}^{m} Prob(Attr\_k = akj \mid Class = Ci)$$

APPENDIX B

Assume we have a data set with m+2 attributes: a case-ID attribute and m+1 attributes $A_i$, i=1 . . . , m+1 with each attribute taking $r_i$ values. Assume that individual values are of a fixed size, so each costs exactly v bytes. The last attribute is a distinguished attribute, and we'll call it "class". Hence, attribute Am+1 is labeled "class". Assume values of class are C1, . . . , Ck.

Our goal is to create a count of occurrence of each attribute value with each value of attribute class. Consider the table shown in Table 1 of this application. Call this table Ptable (for PIVOTed); the desired counts are shown in Table 2. An alternative representation on disk of Table 1 is shown in Table 5. Call this table Utable (for UNPIVOTed).

The two data representations on disk are shown below

UTABLE

| Unpivoted form is a 4 column table | | | |
|---|---|---|---|
| CaseID | AttrID | Attr_val | Class_val |
| ICase 1 | Attr_1 | V_11 | C1 |
| ICase 1 | Attr_2 | V_21 | C2 |
| ... | ... | ... | ... |
| ICase 1 | Attr_m | V_m1 | Cj |

UTABLE-continued

Unpivoted form is a 4 column table

| CaseID | AttrID | Attr_val | Class_val |
|---|---|---|---|
| ... | | | |
| ICaseN | Attr_1 | V_1N | Cj |
| IcaseN | Attr_2 | V_2N | Ck |
| ... | ... | ... | ... |
| ICaseN | Attr_m | V_mN | Cl |

To get our goal Corr_counts table from this table we simply execute the following query:

```
Select AttrID Attr_val, Class_val, count (*)
  From Utable
  Group by AttrID, Attr_Val, Class_val
```

PTABLE

Pivoted form is a m+2 column table

| CaseID | Attr_1 | Attr_2 | ... | Attr_m | Class |
|---|---|---|---|---|---|
| ICase 1 | V_1j | V_1k | ... | V_nl | Ci |
| ICase 2 | V_1i | V_2l | ... | V_nk | Cj |
| ... | ... | ... | ... | ... | ... |
| ICase N | | | | | |

An optimal algorithm for building the Corr_Counts table from either table form will need to scan the table on disk at least once. Let us assume that the counts are achieved by a single scan of the data. The following is a simple analysis to show that Pivoted (Ptable) format wins over the Unpivoted (Utable) formt, even if the attributes are fairly sparse. Ptable is commonly used to represent sparse data. Intuition says that Unpivoted form will win in cases where data is not sparse. However, the surprising result is that even for significantly sparse data the Pivoted format wins!

Cost of Table Scan in the Pivoted table case:
  Cost of Scan for PTable representation is smply:

$$N \cdot m \cdot v$$

In the Sparse table case:
  Let $d_i$ be the density of attribute $A_i$
  So $d_i$ is the proportion of cases in data set for which $A_i$ is defined.
  We need to define a few more sizes:
  Let caseID size be $\log(N)$ (which is a lower bound on actual size)
  Let attribute ID size be $\log(m)$
  Summary of parameters:

| Parameter | Description | Simple approx. | Notes |
|---|---|---|---|
| N | Number of cases | | |
| m | Number of attribute | | |
| v | Size of attribute value | | |
| Log N | Size of index to cases | 3 (constant) | Can be approximated simply by 3 bytes or 4 |
| Log m | Size of attr ID | 1 | Can be approximated with 1 byte constant |
| $A_i$ | Attribute (col) i | | Also Attr_i notation |
| $d_i$ | Proportion of cases in table for which $A_i$ is defined | D | d is the average $d_i$ over all I |

So size of the Utable is:

$$N\left(\sum_{i=1}^{m} d_i(\log N + \log m + v)\right)$$

What we care about is the delta in cost: Δ="scan cost of Ptable"−"scan cost of Utable"

$$\Delta = N\left(\sum_{i=1}^{m} d_i(\log N + \log m + v)\right) - Nmv$$

so $$\text{cost per case} = \frac{\Delta}{N} = \left(\sum_{i=1}^{m} d_i(\log(Nm) + v)\right) - mv$$

So when for all i, $d_i=1$, i.e. the data set is totally dense, cost per case reduces to $$\text{cost per case} = \left(\sum_{i=1}^{m} d_i(Nm) + v\right) - mv$$
$$= m\log(Nm)$$

Which intuitively says that when data is dense, dense wins out.

However, let's consider a case where data is sparse. To simplify, I will let $d_i=d$ for all i, so on average each attribute has density d:

$$\sum_{i=1}^{m} d_i = md$$

If we apply the simplification that size of case ID is say 3 bytes instead of $\log(N)$ and size of attr. ID is 1 byte, and letting v=2 bytes, this further reduces to Hence, $$\frac{\Delta}{N} = \left(\sum_{i=1}^{m} d_i(\log(Nm) + v)\right) - mv$$
$$= (\log(Nm) + v))(md) - mv$$
$$= v(md - m) + md\log(Nm)$$
$$= d(m\log(Nm)) - (1-d)vm$$

-continued $$\frac{\Delta}{N} = d(m(4)) - (1-d)2m$$

$$= 4md - 2m(1-d)$$

$$= 2m[2d - 1 + d]$$

$$= 2m[3d - 1]$$

EXAMPLES if 50% of the values are missing for each attribute, i.e. d=0.5

Then additional cost per case is:

$$0.5(m\log(Nm)) - (0.5)vm = 0.5m[\log(Nm) - v]$$

And since this number is >0, the DENSE table is much more efficient representation of the data.

Assuming some typical numbers, like $N=10^6$, m=300, v=2, with 3 bytes for case ID and 2 bytes for attribute ID We get:

$$0.5 \, (300(2+3)) - 0.5(600) = 450$$

Note that this is cost per case, so there is an N multiple that applies for the cost of scanning the entire table. Hence with $N=10^6$, the cost of scanning Ptable is more by the equivalent of scanning an extra 0.5 Gigabytes.

APPENDIX C

A first of the two new operators discussed in the copending patent application to Graefe et al is referred to as a PIVOT operator. This operator and a complementary operator referred to as 'UNPIVOT' operate on input tables and produce output tables in first normal form. The pivot operator reduces a table with (relatively) many rows and (relatively) few columns to a table with fewer rows and more columns. The UNPIVOT operator is the inverse of the Pivot operator.

The syntax of the pivot operator is T.PIVOT(<first column> for <second column> in (<column list>)). The text between the outermost parentheses is the PIVOT operation's specification. The first two columns designated <first column> and <second column> in the Pivot operator's specification must appear as attributes or fields in the input table T to which the PIVOT operator is applied. If they are not an error will occur.

The 'first column' and 'second column' fields from the input table T are replaced in an output table T' by the fields enumerated in the 'column list' parameter of the Pivot operator specification. In the input table T, items in the 'column list' are data items under the 'second column' heading of the table T. The values in the 'first column' become data values under an appropriate column heading based on the 'column list' of the PIVOT operator's specification.

Consider the operation "Table3.PIVOT ('Profitable' for 'Season' in (Spring, Summer, Fall, Winter))."

PIVOTED TABLE

| StoreType | Region  | Spring  | Summer  | Fall | Winter   |
|-----------|---------|---------|---------|------|----------|
| Shoes     | Midwest | Losing  | Average | ...  | ...      |
| Elecs     | West    | ...     | ...     | ...  | VeryProf |

PIVOTED TABLE-continued

| StoreType | Region | Spring | Summer | Fall | Winter    |
|-----------|--------|--------|--------|------|-----------|
| Misc      | Nwest  | ...    | ...    | ...  | BreakEven |
| ...       | ...    | ...    | ...    | ...  | ...       |

Application of the PIVOT operation causes items in the 'column list' (Spring, Summer etc) to become attributes or field headings in place of the <second column> (Season). Beneath these attributes appear values from the <first column> which in the wexample is the 'Profitable' attribute.

All columns other than those explicitly named in the PIVOT specification are carried over from the input to the output and are called grouping columns. The first named column <first column> is called the 'Pivot' column and the second named column <second column> is called the 'Value' column. The <column list> entries are called the Pivot list.

A row of data does not appear in the PIVOT operator's output table (Table 5) if the value of that row of data under the Pivot column heading (Season in the example) does not appear in the Pivot list. The rows in the input table are grouped together by equal values in the grouping columns so that the output has less rows. Within each grouping there must not be two rows with equal value in the Pivot column so that, for example, in the above example the next entry having store type of 'Shoes' and location of 'Midwest'.

The invention claimed is:

1. A method of generating a tabulation of occurrences of one or more class attributes of database records as a combination of other attributes and attribute values in the database records comprising the steps of
   a) scanning the database records;
   b) for each scanned database record, reformatting the data within said record from a first record format that includes attribute values for one or more attribute names and values for a selected one or more class attributes into a second record format with records that include combinations of attribute names, attribute values and the values for the selected one or more class attributes; and
   c) grouping combinations of data that are scanned from the database to build statistics for the one or more class attributes.

2. The method of claim 1 wherein the steps of reformatting and grouping are performed without materializing a complete table of reorganized records on a storage device.

3. The method of claim 1 wherein the steps of reformatting and grouping are performed in parallel in a multiprocessor computing system.

4. The method of claim 1 wherein to perform the steps of scanning and reformatting an SQL language processor processes an UNPIVOT command.

5. A method of generating a tabulation of occurrences of selected one or more class attributes of database records as a combination of other attributes and attribute values in the database records comprising the steps of
   a) scanning the database records;
   b) for each scanned database record, reformatting the data within said record into records that include combinations of attribute name, attribute value and the selected one or more class attributes, the SQL language processor processes the UNPIVOT command to reformat the data; and c) grouping combinations of data that are scanned from the database to build statistics for the one or more class attributes, the scanning performed by an SQL language processor that processes an UNPIVOT command the UNPIVOT command is combined with a SELECT and a GROUP BY SQL command to provide a counts table without producing an UNPIVOTED table.

6. The method of claim 5 wherein the SQL processor performs an SQL query of the form: Select AttrName AttrVal, Class, Count(*)

From Table1.UNPIVOT(AttrVal for AttrName in Attr_1, . . . Attr_m) Group by AttrName, AttrVal, Class.

7. The method of claim 1 wherein the steps of reformatting and grouping are performed in a pipelined process.

8. The method of claim 1 wherein more than one class attribute is evaluated to build a statistical counts table with each scan of the database records.

9. A method of generating a tabulation of occurrences of selected one or more class attributes of database records as a combination of other attributes and attribute values in the database records comprising the steps of a) scanning the database records, the scanning performed by an SQL language processor that processes an UNPIVOT command;

b) for each scanned database record, reformatting the data within said record into records that include combinations of attribute name, attribute value and the selected one or more class attributes, the reformatting performed by the SQL language processor that processes the UNPIVOT command; and c) grouping combinations of data that are scanned from the database to build statistics for more than one class attributes and more than one class attribute is evaluated to build a database classifier and wherein a statistical count table is built during the process of building the database classifier by means of multiple invocations of the UNPIVOT operator to data in the database.

10. A method of generating a tabulation of occurrences of selected one or more class attributes of database records as a combination of other attributes and attribute values in the database records comprising the steps of a) reorganizing the database records into a specified format by causing an SQL language processor to execute a PIVOT SQL command;

b) scanning the database records the scanning performed by an SQL language processor that processes an UNPIVOT command;

c) for each scanned database record, reformatting the data within said record into records that include combinations of attribute name, attribute value and the selected one or more class attributes, the reformatting performed by the SQL language processor that processes the UNPIVOT command; and d) grouping combinations of data that are scanned from the database to build statistics for one or more class attributes.

11. The method of claim 1 wherein the one or more attributes are duplicated to form the class attributes of a table of records prior to beginning the scanning step.

12. A method for use with a database classifier on a computer including a computer storage device for storing the database; said database classifier processing statistical data from the records of the database, said method characterized by the steps of:

a) scanning records of a database and reformatting each scanned record into a set of records that are based on the contents of the database record attributes so that each of the database records provides multiple records containing combinations of attribute names with attribute types for that record along with the contents of a classifier variable;

b) counting instances of the classifier variable for each of the records in the set of records;

c) grouping the results of the counting step into a count table for use by the classifier; and d) scanning the database for other records to iteratively build a complete count table for use by the database classifier.

13. The method of claim 12 wherein the computer includes a processor that executes software for processing multiple database records simultaneously.

14. The method of claim 12 wherein the count table is built incrementally for each record without maintaining a tabulation of the re-organized set of records.

15. A method for use with a database classifier; said database classifier processing statistical data from the records of the database; said method characterized by the steps of:

a) scanning a database record and creating multiple associated records in a temporary store where the contents of each of the associated records contains a combination of a record attribute and an attribute value of the database record and a classifier variable of said database record;

b) determining a count of the combinations of record attribute name and attribute values for each value or value range of the classifier variable; and c) scanning other records from the database and determining counts for the other records; and d) preparing a tabulation of the counts that are grouped by attribute name, attribute value and classifier value or value range.

16. The method of claim 15 wherein multiple database records are scanned into a computer memory and the determining step is performed in parallel on said multiple database records.

17. Apparatus for use in creating a database classifier; said database classifier processing statistical data from the records of the database; the apparatus comprising:

a) data access means for reading database records from the database;

b) memory means for storing temporary data records based on the data in a database record; and c) processor means for creating temporary data records in said memory means where the contents of each of said temporary records contains a combination of an attribute name and an attribute value of the database record for different classifier attribute values of said database; said processor means including means for determining combinations of attribute name and attribute value for the temporary records; and preparing a tabulation of the counts that are grouped by attribute name, attribute value and classifier value from the temporary records.

18. Apparatus for use in creating a database classifier, said classifier processing statistical data from the records of the database; the apparatus comprising:

a) data access means for reading database records from the database;

b) memory means for temporarily storing data records based on the data in a database record; and c) processor means for creating temporary data records in said memory means where the contents of each of the temporary records contains a combination of an attribute name and an attribute value of the database record for different classifier variable values of said database; said processor means including access means for accessing multiple records from the database and determining combinations of attribute name and attribute value for the other records; and preparing a tabulation of the counts that are grouped by attribute name, attribute value and classifier value; the processor means comprises means for processing SQL commands and wherein an UNPIVOT SQL command reformats the data of a data table which in combination with SQL SELECT and GROUP BY commands creates combinations of attributes and attribute values in a tabulated form in said memory means.

19. The apparatus of claim 17 wherein the processor means tabulates multiple class variables in terms of each other as well as in terms of other non-class variables.

20. The apparatus of claim 17 wherein the processor means comprises multiple central processing units for parallel processing of database records.

21. The apparatus of claim 17 wherein the processor means includes a pipeline processor for simultaneously executing the fetching of data and the reformatting of the data in the database.

* * * * *